April 22, 1924.  W. ENOCH  1,491,203
HOOK
Filed Jan. 15, 1923
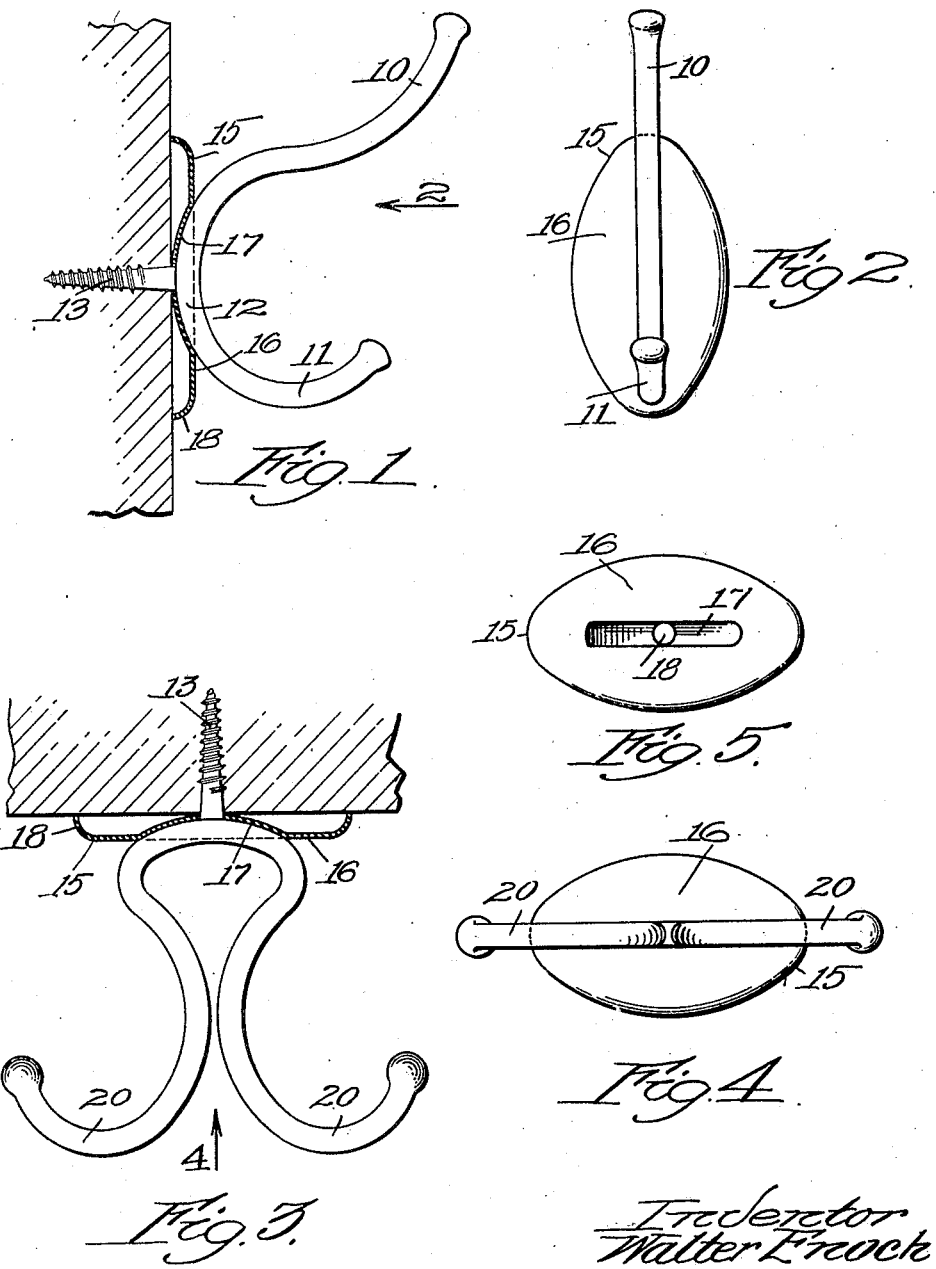

Patented Apr. 22, 1924.

1,491,203

UNITED STATES PATENT OFFICE.

WALTER ENOCH, OF WORCESTER, MASSACHUSETTS, ASSIGNOR TO HOME ACCESSORIES CORPORATION, OF WORCESTER, MASSACHUSETTS, A CORPORATION OF MASSACHUSETTS.

HOOK.

Application filed January 15, 1923. Serial No. 612,578.

*To all whom it may concern:*

Be it known that I, WALTER ENOCH, a citizen of the United States, residing at Worcester, in the county of Worcester and State of Massachusetts, have invented a new and useful Hook, of which the following is a specification.

This invention relates to a hook for use in hanging garments and the like.

The principal objects of the invention are to provide a hook of any desired character in a single piece of wire united to a wood screw in such a manner that the screw forms a part and a continuation of the hook; and to provide a sheet metal plate located behind the hook and under it in such form that it will help hold the hook in fixed position by means of a depression in the front surface of the plate and so that it can be permanently attached to the hook and screw.

Other objects and advantages of the invention will appear hereinafter.

Reference is to be had to the accompanying drawings, in which—

Fig. 1 is a side view of a clothes hook constructed in accordance with this invention and showing the socket plate in section;

Fig. 2 is an elevation of the same;

Fig. 3 is a side view of a double robe or ceiling hook constructed in accordance with this invention;

Fig. 4 is an end view of the same, looking in the direction of the arrow 4 in Fig. 3; and Fig. 5 is a similar view of the socket plate by itself.

Referring first to Figs. 1 and 2, I have shown the invention as applied to a type of clothes hook consisting of a single piece of wire having an upwardly extending member 10 constituting a hook for hanging clothing or the like and located at one end with a shorter lower hook 11 at the other end for a similar purpose. The two hooks 10 and 11 are formed of a single piece of wire. They are connected by a curved portion 12 and on the rear convex surface of this is butt welded the flat end of a wood screw 13 without a head, preferably. The wood screw can be made in the usual way and the head cut off or even the head welded to the hook. But I prefer to manufacture the screws automatically without heads, leaving a flat end and then welding this flat end to the convex surface of the part 12 in such position that when the screw is horizontal the hooks 10 and 11 will be in proper location.

In addition to the features just described, I provide a back plate 15 of sheet metal having a flat surface 16 and of a simple and attractive shape to hide the hole made in the wall by the screw and to form an attractive backing for the hook itself. A novel feature of this plate consists in the provision of a longitudinal groove 17 on the front surface for the reception of the convex portion 12 of the hook. This groove is made to fit the curved surface of the hook at the bottom of the groove and is made just wide enough to receive the hook in it. At the center it is provided with a perforation 18 for the screw 13. In describing this plate I have made use of Fig. 5 which relates to the other form but as far as this plate is concerned, it is substantially the same shape and has the same characteristics as the plate shown in Figs. 1 and 2. The flat front surface 16 of the plate 15 is spaced from the wall by a turned back rim 18. This rim is continuous and uniform and is perpendicular to the wall against which it rests.

In the form shown in Figs. 3, 4 and 5, a double robe hook or ceiling hook is constructed in accordance with this invention. This hook has two diverging curved ends 20 each constituting a hook and the whole hook structure is made out of a single piece of wire. The screw 13 is attached in the same way as shown in Figs. 1 and 2 and the plate 15 is also the same.

It will be seen that the groove 17 in the plate 16 constitutes in itself means for preventing the relative turning of the hook and the plate. These parts cannot turn one on the other after they are assembled even if the plate should get loose from the hook or screw. But I prefer to weld the plate to the screw and hook at the same time that the screw is welded to the hook or in a different operation, if desired. At any rate the three parts are intended to be welded together to form a single piece so that the whole device turns when the screw is screwed into the wood. On account of turning the rim 18 over at right angles the plate is strengthened and the bending of the metal to form the groove 17 also helps strengthen it. Thus comparatively thin metal can be used. The screw is turned in until the continuous flat edge of this rim comes into contact with the wall and at the same time the back of the groove 17 also engages the wall, so a rigid structure is provided when the hook is in use.

Although I have shown and described only two forms of the invention, I am aware of the fact that other modifications can be made therein by any person skilled in the art without departing from the scope of the invention as expressed in the claims.

Therefore, I do not wish to be limited to all the details of construction herein shown and described but what I do claim is:—

1. As an article of manufacture, a wire hook having a rear convex portion adapted to be located adjacent to the wall or surface to which the hook is to be attached, an attaching screw secured to said convex surface and projecting therefrom, and a back plate adapted to cover the wall or shelf adjacent to the place at which the screw enters it, provided with a groove in which the rear convex portion of the hook fits, said plate being secured to the hook and screw.

2. As an article of manufacture, a hook consisting of a single length of wire having a convex portion adapted to be located adjacent to the wall or surface to which the hook is to be attached, a headless wood screw butt welded against said convex surface and projecting therefrom for attachment of the hook to a wall, shelf or the like, and a back plate adapted to cover the wall or shelf adjacent to the place at which the hook is attached thereto provided with a longitudinal groove, longitudinally concave, in which the convex portion of the hook fits snugly throughout the contacting surfaces, said plate being welded to the hook and screw.

3. As an article of manufacture, a hook for hanging clothing and the like, consisting of a single piece of wire and having two curved hook ends and provided with a curved portion between them, a wood screw butt welded against the convex surface of said curved portion and projecting therefrom normally and centrally, and a flat sheet metal back plate welded to the hook and having a flange bent backwardly to form a surrounding surface for engaging a wall or shelf to which the hook is to be attached, said plate having a longitudinal groove therein for receiving the convex side of the curved portion of the wire, the groove being curved backwardly to the plane of the edge of said flange for engaging the adjacent surface of the wall or shelf and assisting said edge to resist the thrust.

4. As an article of manufacture, a double robe hook consisting of a single piece of wire and having two opposite curved hook ends at the same elevation and provided with a curved portion between but elevated above them, a vertical wood screw butt welded against the top convex surface of said curved portion and projecting therefrom upwardly and centrally, and a horizontal sheet metal back plate welded to the upper curved surface of the hook and having a longitudinal groove therein for receiving the top side of the wire, the groove being curved from end to end and engaging the adjacent surfaces of the curved portion of the wire at all points and of a width equal to that of the wire.

In testimony whereof I have hereunto affixed my signature.

WALTER ENOCH.